US007058567B2

(12) United States Patent
Ait-Mokhtar et al.

(10) Patent No.: US 7,058,567 B2
(45) Date of Patent: Jun. 6, 2006

(54) NATURAL LANGUAGE PARSER

(75) Inventors: Salah Ait-Mokhtar, Grenoble (FR);
Jean-Pierre Chanod, Grenoble (FR);
Claude Roux, Grenoble (FR)

(73) Assignee: Xerox Corporation, Stamford, CT (US)

( * ) Notice: Subject to any disclaimer, the term of this patent is extended or adjusted under 35 U.S.C. 154(b) by 945 days.

(21) Appl. No.: 09/972,867

(22) Filed: Oct. 10, 2001

(65) Prior Publication Data
US 2003/0074187 A1    Apr. 17, 2003

(51) Int. Cl.
*G06F 17/27*    (2006.01)
*G06F 17/20*    (2006.01)

(52) U.S. Cl. ............................................. 704/9; 704/1

(58) Field of Classification Search ..................... None
See application file for complete search history.

(56) References Cited

OTHER PUBLICATIONS

Blackburn, Patrick. Gardent, Claire. Wilfried, Meyer-Viol. "Talking About Trees" Proceedings of the 6th Conference on European Chapter of the Association for Computational Linguistics, 1993, pp. 21-29.*
Pericliev, Vladimir. Grigorov, Alexander. "Parsing a Flexible Word Order Language", International Conference on Computational Linguistics, pp. 391-395, 1994.*
Ait-Mokhtar, Salah. Chanod, Jean-Pierre. "Incremental Finite-State Parsing", Proceedings of the 5th Conference on Applied Natual Language Processing, 1997, pp. 72-79.*
Weisweber, Wilhelm. "Using Constraints in a Constructive Version of GPSG", Proceedings of the 12th Conference on Computational Linguistics, vol. 2, 1988, pp. 738-743.*
Sheiber, Stuart M. "A Simple Reconstruction of GPSG" Proceedings of the 11th Conference on Computational Linguistics, 1986, pp. 211-215.*
Dey, Pradip. "Processing Word Order Variation Within A Modified ID/LP Framework", International Conference on Computational Linguistics 1986, pp. 65-67.*
Steven Abney, "Parsing by Chunks," in R. Berwick, S. Abney, and C. Tenny, (eds), *Principle-Based Parsing*, Kluwer Academic Publishers, Dordrecht, 1991.
Salah Aït-Mokhtar et al., "Incremental Finite-State Parsing," *Proceedings of Applied Natural Language Processing*, 1997, Washington, DC, Apr. 1997.

(Continued)

*Primary Examiner*—Richemond Dorvil
*Assistant Examiner*—Matthew J. Sked
(74) *Attorney, Agent, or Firm*—Oliff & Berridge, PLC

(57) ABSTRACT

The present invention provides a method and a parser for syntactically analyzing an input string. The parser applies a plurality of rules which describe syntactic properties of the language of the input strings. The plurality of rules comprise two types of rules. A first type of rules comprises immediate dominance rules and linear precedence rules. A second type of rules being sequence rules. All rules of the plurality of rules are applied according to a predefined order to the input string. This new incremental parsing architecture has advantages with respect to grammar engineering and allows a more efficient parsing.

23 Claims, 5 Drawing Sheets

OTHER PUBLICATIONS

Salah Aït-Mokhtar et al., "Subject and Object Dependency Extraction Using Finite-State Transducers," *ACL Workshop On Automatic Information Extraction and Building of Lexical Semantic Resources for NLP Applications*, Madrid, 1997.

Claude Roux, "Phrase-Driven Parser," *Proceedings of VEXTAL '99*, Nov. 22-24, 1999, Venezia, San Servolo, V.I.U.

Gregory Grefenstette, "Light Parsing as Finite-State Filtering," *Workshop on Extended Finite State Models of Language ECAI '96*, Budapest, Hungary 11-12, 1996.

Martin Volk, "Parsing with ID/LP- and PS-rules," *Proceedings of the 3rd KONVENS Conference*, Bielefeld, 1996.

Gerald Gazdar, "Phrase Structure Grammar," in P. Jacobsen et al. (eds), *The Nature of Syntactic Representation*, pp. 131-186, *D. Reidel Publishing Company*, 1982.

J. Earley, "An Efficient Context-Free Parsing Algorithm," *Communications of the ACM*, vol. 13, No. 2, pp. 94-102 Feb. 1970.

Stuart M. Shieber, "Direct Parsing of ID/LP Grammars," *Linguistics and Philosophy*, vol. 7(2), pp. 135-154, *D. Reidel Publishing Company*, 1984.

Roux, C.: "Phase-Driven Parser", *Proceedings of VEXTAL '99*, Nov. 22-24, 1999, pp. 235-240. URL http://project.cgm.unive.it/events/papers/roux.pdf.

Aït-Mokhtar, S. et al.: "A Multi-input Dependency Parser", 7th International Workshop on Parsing Technologies, Oct. 19, 2001 (4 pp). URL http://www.xrce.xerox.com/Publications//Attachments/2001-015/iwpt2001.pdf.

Abney, S.: "Partial Parsing via Finite-State Cascades", European School in Logic, Language and Information Workshop on Robust Parsing, 1996, pp. 8-15.

Aït-Mokhtar, S. et al.: "Incremental Finite-State Parsing", Proceedings 5th Conference on Applied Natural Language Processing, Mar. 31-Apr. 3, 1997 (8 pp). URL http://www.xrce.xerox.com/Publications/Attachments/1997-001/ifsp.pdf.

\* cited by examiner

FIG. 2A
- *the nice dog*
- *the dog*
- *dogs*
- *The black and white dog.*

FIG. 2B
NP -> noun, (det), ap*,(coord).

FIG. 3
[det:+] < [noun:+]

FIG. 4
NP=det,ap,noun.
NP=det,noun.
NP=noun.
NP=det,ap,coord,ap,noun.

FIG. 5A { *the dog black...*

FIG. 5B { *the dog black as the night*

NP -> noun[last:+], (det[first:+]), ap*[last:~],(coord[last:~,first:~]).

FIG. 8 { SC = NP, ?*[verb:~], VP.

FIG. 9 { NP = DET, NOUN, ADJ; NOUN

SC = |VP [that_comp] | Conj[form:that], NP, ?*, VP.

FIG. 10A

FIG. 10B { *Harry said that the dog likes soup.*

Input:
L'usine, qui devrait être implantée à Eloyes (Vosges) représente un investissement d'environ 3,7 milliards de yens (148 milliards de francs).

GROUPE{
    SC{NP{l' usine}},
        SC{BG{qui} FV{devrait}}
        IV{être implantée}
        PP{à NP{Eloyes}}
        INS{( NP{Vosges} )}
        FV{représente}
    NP{un investissement}
    PP{d' NP{environ 3,7 milliards}}
    PP{de NP{yens}}
    INS{( NP{148 milliards} PP{de NP{francs}} )}
    .
}

FIG. 11

NATURAL LANGUAGE PARSER

BACKGROUND OF THE INVENTION

1. Field of the Invention

The present invention relates generally to natural language processing and more particularly, to a parser and a method for parsing an input string.

2. Description of Related Art

Parser and parsing methods perform an automatic syntax analysis of an input string in order to assign structural descriptions to the input string. A parser analyses input strings based on a predefined set of principles and rules with the aim of establishing a rule-compliant (correct) sentence structure.

The inner structure of a sentence may be defined using different grammar formalisms. A grammar formalism defines the inner structure of a language using rules and principles. Examples for grammar formalisms are GPSG (generalized phase structure grammar) or HPSG (head-driven phase structure grammar). A grammar formalism like GPSG describes the syntax structure of a natural language using rules and feature constraints.

A syntax structure of an input string may be represented in the form of a tree. Constituents within such a tree may be a noun phrase (NP), a verbal phrase (VP), a prepositional phrase (PP), and an adjective phrase (AdjP). Constituents may represent elements or larger units of elements of an input string. An example for a noun phrase (NP)is:

Det+N and an example for a verbal phrase is:

Verb+NP+PP.

A parser performs a syntax analysis of an input string based on a set of predefined rules. A rule replaces subsequent elements or constituents of an input string by another constituent. A well known type of rules are sequence rules. A sequence rule has the form of:

A→B1 . . . Bn

The number of elements to be replaced is represented by Bi and the new symbol on a higher level is represented by A. The consecutive elements B1 . . . Bn are only replaced by A when elements Bi are present in the predefined order of 1 . . . n.

rules cannot express generalizations which are only implicitly included in these rules. Newer rules, introduced by grammar formalisms like GPSG separate between dominance relations and precedence relations. Dominance rules (immediate dominance rules—ID rules) only define dominance relations between a higher level unit and the lower level elements. A dominance rule describes lower level elements in any order. A particular order of lower level elements is defined by precedence rules (linear precedence rule—LP rules). The use of ID/LP rules may replace a plurality of sequence rules, which would be necessary to describe the same definition.

The syntax analysis of a parser is generally based on one of three different strategies, namely using a feature-value grammar, a LR-grammar, or a finite-state transducer. The most common strategy is based on feature-value grammars, especially with chart parsers. Such grammars are usually stored in one single space. The parser has to find out the best rule to be applied on a sequence of categories of an input string. It is a drawback of feature-value grammars that the employed strategies are very complex and require a huge computational effort. On the other hand, these grammars provide a good readability of the formalism describing grammatical events and has the ability to process rich lexical information.

The LR grammars are another type of strategy commonly used. This strategy is based on a stack algorithm combined with decision tables. The rules of this grammar utilize specific operators for combining or skipping sequences of categories. These grammars usually result in a fast and more economic automatic syntax analysis. On the other hand, these grammars are usually difficult to read and to maintain. In addition, the scope of these grammars is usually limited to categories that are next to each other in a sequence and long range dependencies are difficult to implement.

The third strategy is based on finite-state transducers which are combined in order to described certain sequences of categories. Each transducer applies to a sequence of categories in a predefined order. Although this approach allows fast and robust parsers, it is difficult to exploit fine-grained lexical information and to express complex phenomena in a readable way.

SUMMARY OF THE INVENTION

The present invention is made in consideration of the above situation and it is the primary object of the invention to provide an improved method and an improved parser for parsing an input sentence.

It is another object of the invention to provide a method and a parser of high efficiency.

It is still another object of the present invention to provide a method and a parser providing higher flexibility in grammar writing.

It is yet another object of the invention to provide a parser and a method for parsing an input string which allow easier control of side effects among rules in a grammar.

These and other objects of the present invention will become apparent hereinafter.

To achieve these objects, the present invention provides a method and a parser for parsing an input sentence in order to automatically generate a syntax description of the input string. Conventionally, parsers are based on only one type of rules. These rules are employed to describe all kinds of syntactic properties. These properties may range from the constitution of a phrase to the concatenation of large phrases to form a sentence.

The present invention uses a new parsing architecture combining two types of rules in a set of grammar rules wherein the rules are processed in a predefined order. The parsing strategy of the present invention is particularly based on incrementality. Each rule of the plurality of rules is only applied once during the parsing procedure, i.e. in contrast to conventional approaches, the rules are applied in a non-recursive manner. A combination of ID/LP rules and sequence rules allows a more efficient parsing and a more flexible way of writing language grammars. Depending on the requirements of an underlying language phenomena a rule may define a full or partial ordering of string elements. Such an approach results in a parsing strategy of higher readability, efficiency and robustness.

In another embodiment of the present invention, the rules are grouped to a plurality of layers. The layers are numbered and applied in a cascade order from the first to the last layer. The output of each layer is input to the next layer of the predefined order. It is the particular advantage of such a layered approach to provide an easy to read and efficient parsing strategy. For instance, simple and linguistically more constraint language phenomenas may be defined first and more complex language phenomena may be left for subsequent layers.

According to another embodiment, the rules are stored in layers and applied incrementality in each layer.

According to another aspect, each layer only contains a single type of rules.

In another aspect, the present invention provides a computer program product for use in a computer system for parsing an input string. The computer program product comprises a computer readable medium having a computer readable program code stored thereon.

As those skilled in the art will appreciate, an aspect or aspects of a particular embodiment may be combined with another aspect or aspects of another embodiment.

BRIEF DESCRIPTION OF THE DRAWINGS

The accompanying drawings are incorporated into and form a part of the specification to illustrate several examples of the present invention. These drawings together with a description serve to explain the principles of the invention. The drawings are only for the purpose of illustrating preferred and alternative examples of how the invention can be made and used and are not to be construed as limiting the inventions to only the illustrated and described examples. Further features and advantages will become apparent from the following and more particular description of the various embodiments of the invention, as illustrated in the accompanying drawings wherein:

FIG. 2a shows examples for an input string;

FIG. 2b gives an example for an immediate dominance rule (ID rule);

FIG. 3 shows a linear precedence rule (IP rule);

FIG. 4 shows a list of sequence rules which would correspond to a combination of the ID rule of FIG. 2b and the LP rule of FIG. 3;

FIGS. 5a and 5b give examples for input sentences;

FIG. 5c shows an example of an IP rule including additional features defining a first and last element;

FIG. 6 gives an example for a sequence rule including a symbol representing any category;

FIG. 7 gives an example for a sequence rule including a symbol for representing any category to replace the "longest match";

FIG. 8 gives an example of a sequence rule including a symbol for representing any category further defined by a context feature;

FIG. 9 gives an example for a sequence rule defining a disjunction of categories;

FIG. 10a gives an example of a sequence rule being further defined by a context feature;

FIG. 10b gives an example for an input string to illustrate the application of the sequence rule of FIG. 10a; and FIG. 11 gives an example of an automatic syntax analysis result.

DETAILED DESCRIPTION

Figure 1:
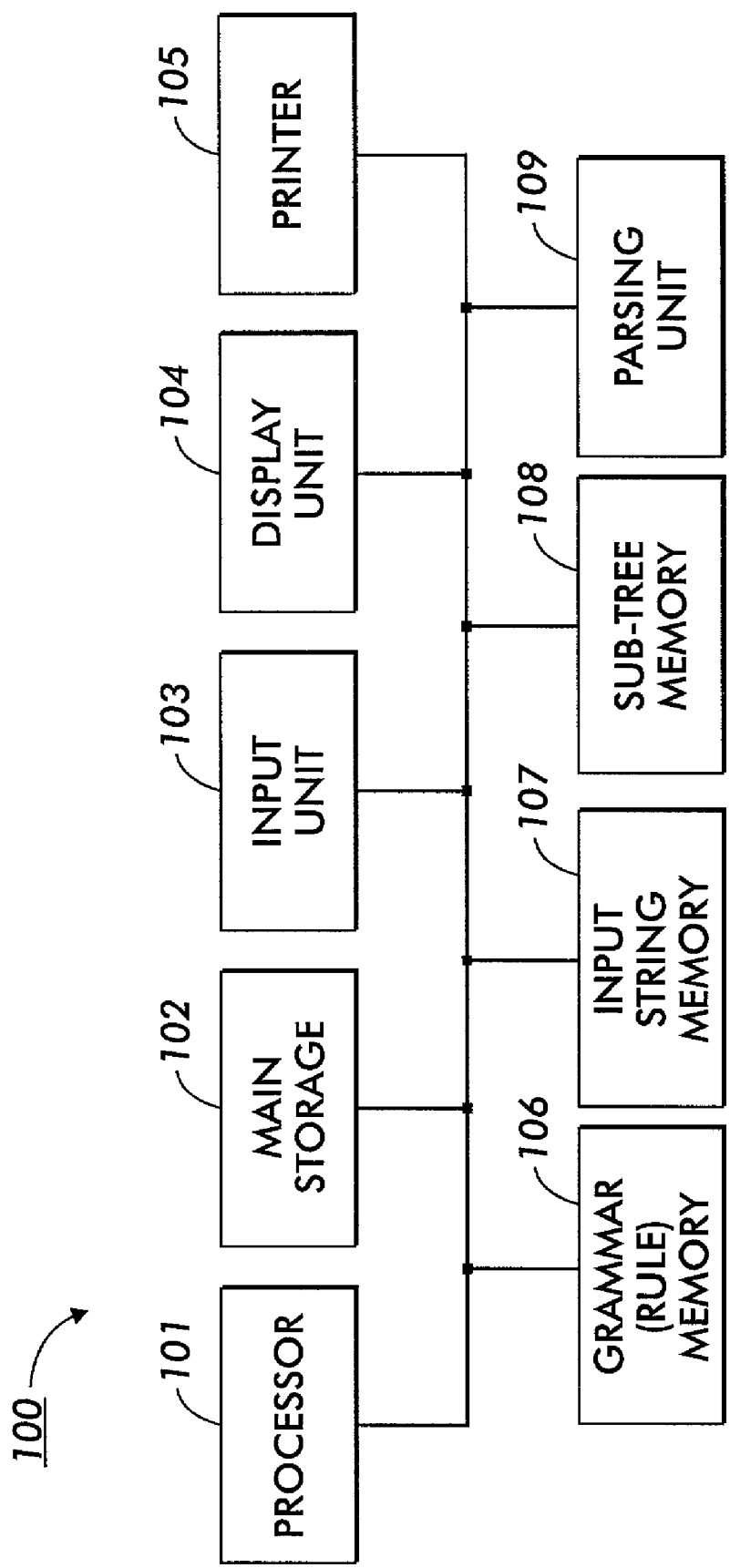
FIG. 1 illustrates a schematic diagram of a computer system according to the present invention.

The illustrative embodiments of the present invention will be described with reference to the drawings.

As illustrated in FIG. 1, the computer system 100 according to the present invention comprises an input unit 103 for receiving an input string to be subjected to a syntax analysis. The input unit 103 is connected to a processor 101 for performing the parsing procedure. In addition, a display unit 104 and/or a printer 105 are connected to the processor 101 for outputting the result, i.e. a syntax analysis of the input string. The computer system 100 transforms the input string received via input unit 103 into a parsing result to be outputted by one of the output units.

As those skilled in the art will appreciate, the computer system 100 preferably comprises a main storage 102 for storing program code, such as an operating and application programs, and data. The computer system 100 preferably further comprises external memory (not shown) such as a hard disk drive, a floppy disk drive or a CD or DVD drive for storing the program code and data more permanently. The computer system 100 may further comprise additional devices (not shown) for interaction with the user like a keyboard or a pointing device.

The computer system 100 may further comprise additional devices for parsing an input string. A particular processing unit 109 may carry out the parsing of an input string. The grammar rules applied by parsing unit 109 may be stored in a grammar memory 106 for storing a plurality of predefined rules. The input text may be stored in a particular memory 107 and the intermediate and final parsing results may be stored in an additional memory 108. Those skilled in the art will appreciate, that all memories of this computer system may be provided separately or are integrated into a single memory.

Conventionally, methods of parsing an input string apply rules which are stored in one single space. A parser has to sort out that rule to be applied at a given step of the analysis to an input string. The parser has to differentiate between those rules belonging to the current analysis level or which belong to a different level of the syntax analysis. For instance, a parser has to select between rules that build a basic nominal phrase and rules that build a coordination of nominal phrases. All rules are available and tested once at any single stage of parsing.

In addition, conventional parsers only handle one type of rules. Such rules are employed to describe all kinds of syntactic properties from a constitution of a phrase to the concatenation of large phrases forming a sentence. Important types of these rules are immediate dominance rules (together with linear precedence rules) and sequence rules.

Immediate dominance rules describe a set of elements that should be replaced by a single category. These rules (ID rules) describe a dominance relation and are often combined with linear precedence rules (LP rules). Precedence rules impose a partial order between some of the elements that an immediate dominance rule can span. Sequence rules describe a sequence of categories with a fixed order (as defined in context free grammars).

It is the particular aspect of the present invention to combine immediate dominance rules (together with precedence rules) and sequence rules. These rules may be optionally restricted by a contextual sequence of categories. This new approach or architecture provides different points of view on categories, whether a certain set of categories is analyzed as a stack of categories or a sequence or categories.

Immediate dominance rules describe sets of elements which are specified on the right side of a rule that are reduced to a category specified on the left side of the rule. The right side of these rules is not ordered. Immediate dominance rules apply to a bag of elements. FIG. 2b gives an example for an immediate dominance rule. The category of a "noun phrase" (NP) will be assigned to a bag of elements as indicated on the right side of the rule. This rule applies to all input strings as shown in FIG. 2a. This rule does not introduce any in order between the categories on the right side of the rule. It applies to large variety of sentences with a single compact description, however, at the cost of allowing over-generation.

Ordering constraints can be defined using linear precedence rules. An example for a linear precedence rule is given in FIG. 3. The example of FIG. 3 imposes that a determiner should precede a noun. According to the present invention, precedence rules may apply on any set of features, not only categories.

Instead of dominance and precedence rules sequence rules could have been used for the above definitions. When transforming the above rules into an equivalent set of context free rules, the rules as shown in FIG. 4 would be necessary. The number of context free rules would be larger and adversely affect their readability, coverage and parsing efficiency.

According to a further embodiment of the present invention, the set of predefined rules may be stored in layers. In addition, the predefined rules may be applied incrementality within each of the layers. Input strings are initially transformed in a sequence of categories. This sequence of categories is processed incrementality through the different layers. The whole input string is represented at any stage of the parsing procedure by a sequence of sub-trees.

During the parsing procedure, each layer combines sub-trees from the current stream and produces a reduced sequence of sub-trees as a new current stream. Any given layer applies to the whole sequence of sub-trees.

The sequence of sub-trees is updated with each rule applied successfully. New root nodes replace the matched nodes in the sequence of sub-trees. Unmatched sub-sequences are kept at the same level in the sequence. The output of each layer is the input of the next layer.

The layered approach of this invention results in higher readability, better rule control and increased efficiency and better robustness. The design of a grammar may be based on different types of rules. In addition, according to the present invention it is specified which rule should apply first. For instance, the simplest or more linguistically constraint phenomena may be described first and more complex phenomena may be left to subsequent layers.

Rules relating to the same linguistic phenomena may also be split over multiple layers depending on the set of constraints that restrict the application of the corresponding rules. This introduces a notion of hierarchies of constraints attached to a given phenomenon. In addition, recursivity can be modeled over the system through different levels of layers.

The parser of the present invention can be implemented so that it does not backtrack to test another configuration. This reduces considerably the computational effort of the parsing engine as any storage of previous context of the parsing procedure is not necessary. When the parser does not backtrack, the time required for a syntax analysis does not increase exponentially with the length of the input string.

Conventionally, a parser needs a blocking mechanism to solve conflicts between rules. The parser of the present invention does not need any complex blocking mechanism as the control of rules to be applied is performed by a distribution of rules over different layers. The rules of each layer are applied during a different processing stage. This improves the parsing efficiency. Specific blocking conditions during the parsing procedure are not necessary and a complex rule management may be omitted.

This approach also avoids a proliferation of spurious and unwanted parses (cf. combinatorial explosion). Such unwanted parses often result in traditional parsing approaches that lack an appropriate control mechanism for restricting the application of rules.

Conventional parsers aim to find a single category that spans the whole input string. This corresponds to the notion of axiom in formal definitions of syntax expressions. Such an approach results in a parsing failure as soon as a given sub-string in the input string is not recognized by the grammar. Consequently, such traditional grammars tend to have lower coverage and require post-parsing mechanisms to cover partial parses in case of full-parse failure.

A parser according to an embodiment of the present invention reduces the number of categories through the application of rules in different layers. This approach does not require to reduce an initial sequence of categories to a single category at the end of the parsing procedure. The final result of the syntactic analysis may include a combination of unspecified and fully analyzed constituents. The parser of the present invention always yields a result, regardless how many rules match or do not match.

The layered incremental approach of the present invention enables an easier interaction between rules than possible by conventional parsers. A change introduced in a given layer of a parser according to the present invention only effects subsequent layers. On the other hand, tracking the effect of such changes in conventional parsers is almost impossible as all rules may apply and interact at any time during the parsing procedure.

If a given rule is incorrectly applied during a syntax analysis by a parsing method of the present invention, it is possible to further restrict the particular rule by additional constraints. For instance, a rule may be applied to a substring which should be left unmodified.

Such constraints reduce grammar precision depending on how much the linguistic description in subsequent layers is based on over generation from previous layers. However, such constraints do not adversely affect the truth-value of subsequent layers. If, on the other hand, a linguistic phenomenon is not covered broadly enough, the constraints of an existing rule may be broadened or a new rule may be added. Over-generation introduced by a preceding layer may be overcome by further restricting rules in a subsequent layer.

According to an embodiment of the present invention, a layer only contains rules of a single type. Layers comprising different types of rules may be interlaced with each other. The layers are number and applied according to their number. The output of each of the layers is input to the subsequent layer.

According to an additional aspect of the present invention, all rules may further comprise context feature definitions to restrict the application of a rule to a particular context. Such additional restrictions may relate to lexical features or may depend on the stage of the parsing procedure. Logical operations on such features may relate to equality, negation, presence or absence of such features.

In another embodiment of the present invention, immediate dominance rules (ID rules) may further include a restriction defining a particular feature of the first and the last element of a sequence of categories. This enables additional ordering constraints which had normally to be defined using precedence rules (LP rules).

Some syntactic constituents can be specified based on their border constituents being located at the beginning and at the end of the constituent. The internal structure is underspecified wherein the exact order of the inner elements remains variable. ID-rules have the advantage of describing constituents in an efficient and compact way, and additionally to allow for the use of the longest match.

A French language example wherein valid verbal chunks include such strings as:

il permet
il le permet
il lui avait permis
il ne le lui avait jamais vraiment permis
il ne lui a vraiment pas ete permis
il ne lui a pas ete toujours permis Some chunks optionally include auxiliaries (avait), clitic pronouns (le, lui), negation (ne), adverbs (jamais, vraiment) between the borders, i.e. in this example, the subject (il) and the head verb (permet, permis). DI-rules can cover all those constructions in a compact and flexible way, without imposing strict ordering.

On the other hand, some constituents need to be specified with great precision (regarding their inner structure, esp. The order of the elements). A good example is a grammar for dates or numerical expressions.

Another example for this can be seen in FIG. 5. Both example strings shown in FIGS. 5a and 5b comprise the same portion "the dog black". However, both example strings may be differentiated when applying the rule given in FIG. 5c. This rule includes the feature that a "noun" is always the last category of the sequence. This rule cannot be applied to a sequence having an "ap" or a "coord" as a last element. The rule of FIG. 5c does not apply to "the dog black . . . " as shown in FIG. 5a an "ap" cannot occur as the category feature of the last element.

Immediate dominance rules in conjunction with linear precedence rules are mainly utilized to describe phrases that contain lexical elements. These rules provide a very efficient way to describe phrases when the type of category is more important than its position.

Further, the parsing engine selects first that rule in a given layer which applies on the largest bag of categories extracted from an input string. When a rule applies successfully the parsing engine searches for the next bag of categories being compatible with the set of rules defined in the current layer.

In contrast, sequence rules may only successfully be applied to elements of a predefined order. Sequence rules may additionally comprise the symbol "ANY", denoted as "?". This symbol may represent any category at the particular position. The symbol "ANY" may itself be further restricted by feature-value constraints.

An example for a sequence rule including the ANY symbol is shown in FIG. 6. This rule replaces the shortest sequence starting with a NP and ending with VP.

The NP symbol may be used together with a "longest match" operator, denoted @. The rule of FIG. 6 including this operator is shown in FIG. 7. This rule replaces the longest sequence starting with a NP and ending with VP.

The ANY symbol may be combined with specific feature definitions. For example, the symbol may be combined with the definition "verbal". Such context features provide an efficient way to improve the specific rule. An example for such a feature definition is shown in FIG. 8. The definition attached to the ANY symbol leads to the result that this rule only successfully applies to a sequence not containing a verb in between.

In addition, a sequence rule may be further restricted by defining a "disjunction of categories". A disjunction is denoted by a semi-colon between the respective elements. An example for a disjunction definition is given in FIG. 9. The example rule creates an NP having a head noun which is post-modified either by an adjective or a noun.

Sequence rules are useful to describe long sequences of categories, such as when the categories between anchors, e.g., the mandatory categories, match a large set of possible values that can be represented by the ANY symbol.

When applying a sequence rule, the parser indexes the rules of the first category and tries each rule one after the other. If a category in a sequence corresponds to the index of a rule, the rule is applied to the sequence starting at this category. If the rule and its context match, this sequence is replaced by the "mother category" of the respective rule. When all rules of a layer have been applied, the parser proceeds to the subsequent layer.

The context features of a rule may be further restricted using context elements on the left and right side. Each type of rules (immediate dominance rules or sequence rules) may refer by additional features to context on the left or right side. Such a context definition may be based on a sequence of categories. The context of a rule is taken into account each time a core part of a rule matches a sequence of the input string.

An example is given in FIG. 10. FIG. 10a shows a rule comprising an additional context definition attached on the left side of the rule (printed in bold letters). This rule defines that the conjunction "that" followed by an "NP" and a VP forms a clause SC if its immediate left context is a VP which further sub-categorizes the feature "that_comp". This rule would successful apply to the example sentence as shown in FIG. 10b.

A main objective for the new inventive approach is to account for more fine-grained linguistic information while improving the computational efficiency with regard to memory and speed. In addition, the parsing engine never backtracks on a rule that has matched a bag or a sequence of categories. This implementation improves the speed and simplicity of a linguistic description.

An example for an implemented parsing engine for a syntactic analysis of French language input strings include a chunker containing thirteen layers. The thirteen layers comprise eight layers of immediate dominance rules and five layers of sequence rules. The grammar distributed on the thirteen layers contains sixty immediate dominance rules and twelve sequence rules. This parser has been implemented on a SUN Ultra-Enterprise computer system. The speed of the chunker is about five thousand words/s including preprocessing (tokenization, morpho-analysis and part-of-speed disambiguation).

An example of a syntax analysis of a French language input string is shown in FIG. 11.

As those skilled in the art will appreciate, other various modifications, extensions, and changes to the foregoing disclosed embodiments of the present invention are contemplated to be within the scope and spirit of the invention as defined in the following claims.

What is claimed is:

1. A method for parsing an input string that includes elements by applying a plurality of rules which describe syntactic properties of the language of the input string, the plurality of rules comprises two types of rules, a first type of rules consisting of immediate dominance rules, which define dominance relations between constituents of the grammar rules, and linear precedence rules, which define an order of grammar constituents, and a second type of rules defining dominance and precedence relations of grammar constituents in a fixed sequence order, wherein the rules of said plurality of rules are applied according to a predefined rule order, and said plurality of rules is distributed into layers that are applied in a predefined layer order, with each layer containing only the first type or the second type of rules.

2. The method of claim 1 wherein an output of a layer of said layers is an input of a subsequent layer, and said predefined layer order applies constraint phenomena in increasing complexity.

3. The method of claim 1 wherein a rule of said plurality of rules is further defined by at least one context feature.

4. The method of claim 1 wherein an immediate dominance rule further defines the first constituent and the last constituent of a rule.

5. The method of claim 1 wherein a rule of said second type may include a constituent definition representing any constituent.

6. The method of claim 5 wherein a rule of said second type may further use a definition of replacing the longest sequence of constituents between the preceding and subsequent constituent.

7. The method of claim 5 wherein the definition of any constituent may be further defined by a context feature.

8. The method of claim 1 wherein a rule of said second type may be further defined by a disjunction of constituents.

9. The method of claim 1 wherein a processed input string is represented by a sequence of sub-trees.

10. The method of claim 9 wherein each successful application of a rule results in a combination of sub-trees.

11. The method of claim 1 wherein the rule applied first combines the largest numbers of constituents.

12. The method of claim 1 wherein the order of constituent definitions in a rule of said second type is based on features of the constituents.

13. The method of claim 1 wherein a given constituent occurs in any number of times.

14. The method of claim 1 wherein the second type of rules include a symbol that represents any category for a set of the elements at a particular position, and the symbol is restricted by a feature-value constraint.

15. The method of claim 14, further including an operator to replace a longest sequence between first and second phrases.

16. The method of claim 15, further including a clause that includes a sub-category feature, the first phrase, the operator and the second phrase.

17. The method of claim 16 wherein a context definition of the elements is based on a sequence of the first and second phrases.

18. The method of claim 14 wherein the any category between mandatory categories is represented by the symbol.

19. The method of claim 1, wherein each rule is only applied once during the parsing.

20. A parser for parsing an input string that includes elements, said parser comprising a grammar rule database storing a plurality of rules, which describe syntactic properties of the language of the input string, the plurality of rules comprises two types of rules, a first type of rules consisting of immediate dominance rules, which define dominance relations between constituents of the grammar rules, and linear precedence rules, which define an order of grammar constituents, and a second type of rules defining dominance and precedence relations of grammar constituents in a fixed sequence order, and said parser being adapted to apply the rules of said plurality of rules according to a predefined order, and said plurality of rules is distributed into layers that are applied in a predefined layer order with each layer containing only the first type or the second type of rules.

21. The parser of claim 20, wherein each rule is only applied once during the parsing.

22. A computer program product for use in a computer system for parsing input strings, the computer program product comprising a computer readable medium having a computer readable program code thereon, the computer readable program code causing the computer system to parse an input string that includes elements by applying a plurality of rules which describes syntactic properties of the language of the input string, the plurality of rules comprises two types of rules, a first type of rules consisting of immediate dominance rules, which define dominance relations between a constituents of the grammar rules, and linear precedence rules, which define an order of grammar constituents, and a second type of rules defining dominance and precedence relations of grammar constituents in a fixed sequence order, wherein the rules of said plurality of rules are applied according to a predefined order, and said plurality of rules is distributed into layers that are applied in a predefined layer order with each layer containing only the first type or the second type of rules.

23. The computer program product of claim 22, wherein each rule is only applied once during the parsing.

* * * * *